United States Patent
Tada et al.

(10) Patent No.: US 7,426,164 B2
(45) Date of Patent: Sep. 16, 2008

(54) DISK KIND IDENTIFYING METHOD AND DISK APPARATUS

(75) Inventors: Kouichi Tada, Gifu (JP); Mitutaka Yamaguti, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 451 days.

(21) Appl. No.: 10/660,773

(22) Filed: Sep. 12, 2003

(65) Prior Publication Data

US 2004/0052181 A1 Mar. 18, 2004

(30) Foreign Application Priority Data

Sep. 17, 2002 (JP) .............................. 2002-269899

(51) Int. Cl.
*G11B 27/36* (2006.01)
(52) U.S. Cl. .................................................. 369/53.2
(58) Field of Classification Search .............. 369/53.2, 369/53, 22, 53.23, 47.3
See application file for complete search history.

(56) References Cited

U.S. PATENT DOCUMENTS

| | | | | |
|---|---|---|---|---|
| 6,822,936 B2* | 11/2004 | Ono et al. | ................ | 369/53.23 |
| 2002/0075780 A1* | 6/2002 | Ogihara | ................... | 369/53.23 |
| 2002/0105864 A1* | 8/2002 | Ogawa | ..................... | 369/44.13 |
| 2002/0150017 A1* | 10/2002 | Ono et al. | ................ | 369/53.23 |

FOREIGN PATENT DOCUMENTS

| | | |
|---|---|---|
| JP | 09-198779 | 7/1997 |
| JP | 2000322742 A * | 11/2000 |
| JP | 2002-100041 A | 4/2002 |
| JP | 2002-237069 A | 8/2002 |

* cited by examiner

*Primary Examiner*—Thang V Tran
(74) *Attorney, Agent, or Firm*—Arent Fox LLP

(57) ABSTRACT

A disk apparatus is for a disk, and a DVD-RW or a DVD+RW can be mounted as the disk. For example, a wobble signal is detected on the basis of a laser beam reflected by a recording surface of the disk. A CPU determines whether a cycle of the wobble signal (wobble cycle) is 32 times or 186 times as long as a data cycle on the basis of a detection result of a detecting circuit. Then, when the wobble cycle is 186 times as long as the data cycle, the disk kind is identified as the DVD-RW, and when the wobble cycle is 32 times as long as the data cycle, the disk kind is identified as the DVD+RW.

2 Claims, 7 Drawing Sheets

FIG. 2
(A)
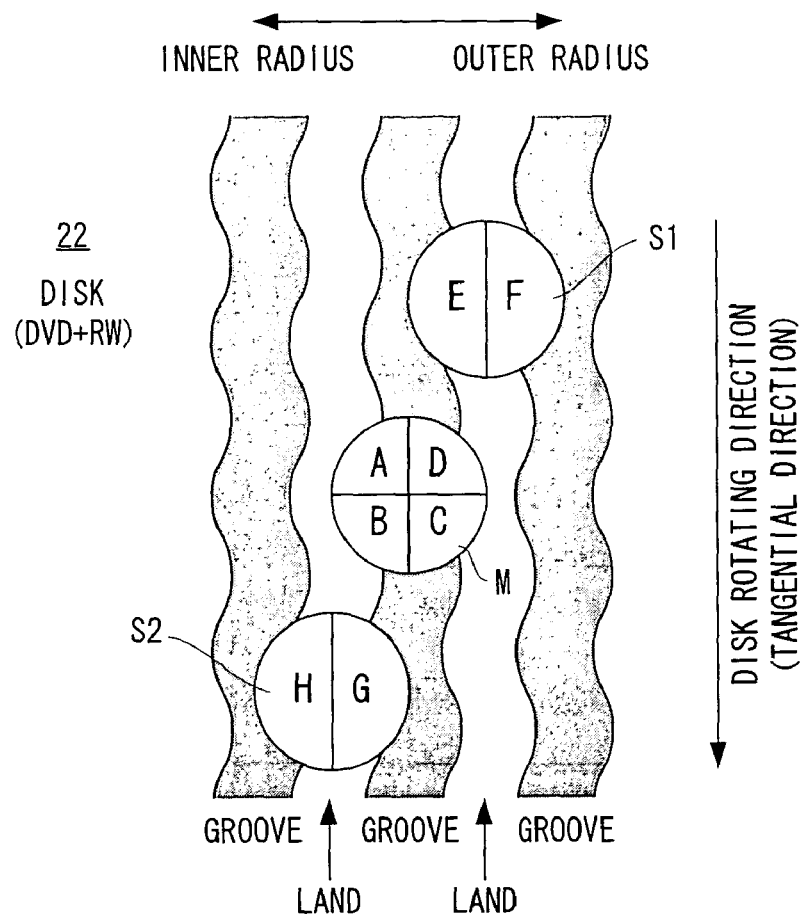
(B)
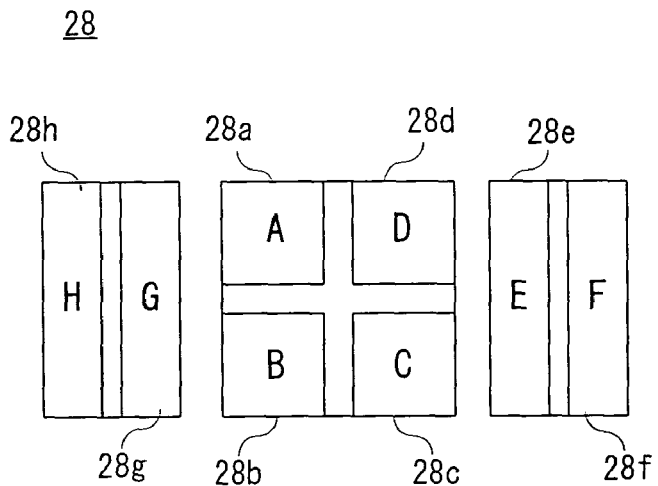

FIG. 4
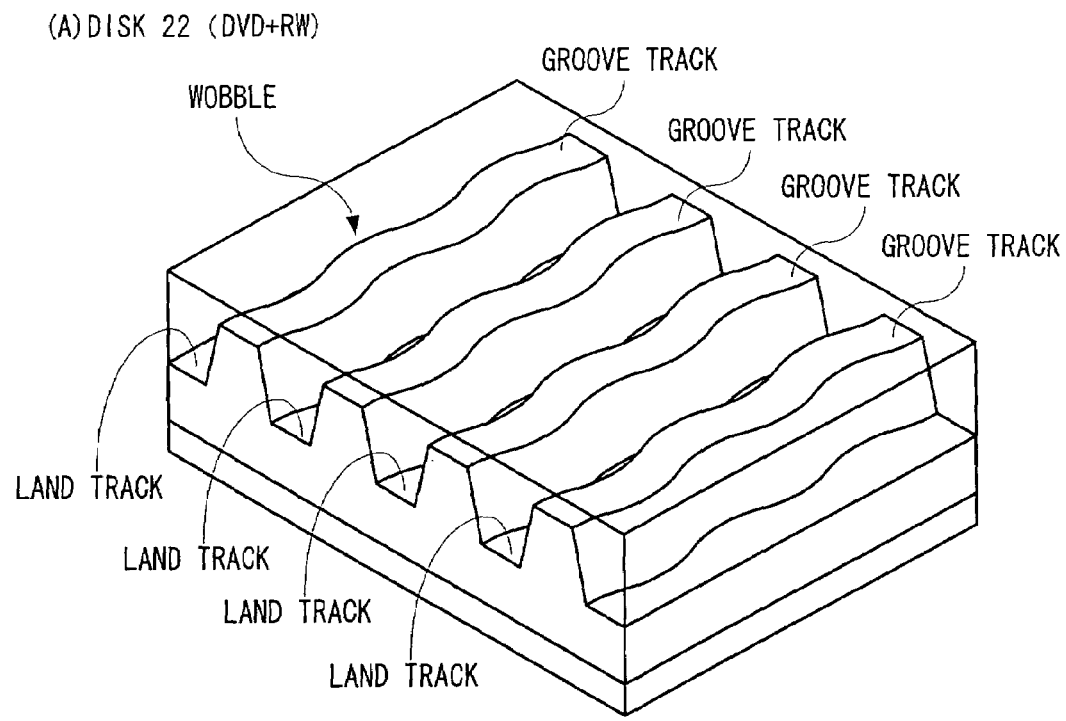
(A) DISK 22 (DVD+RW)
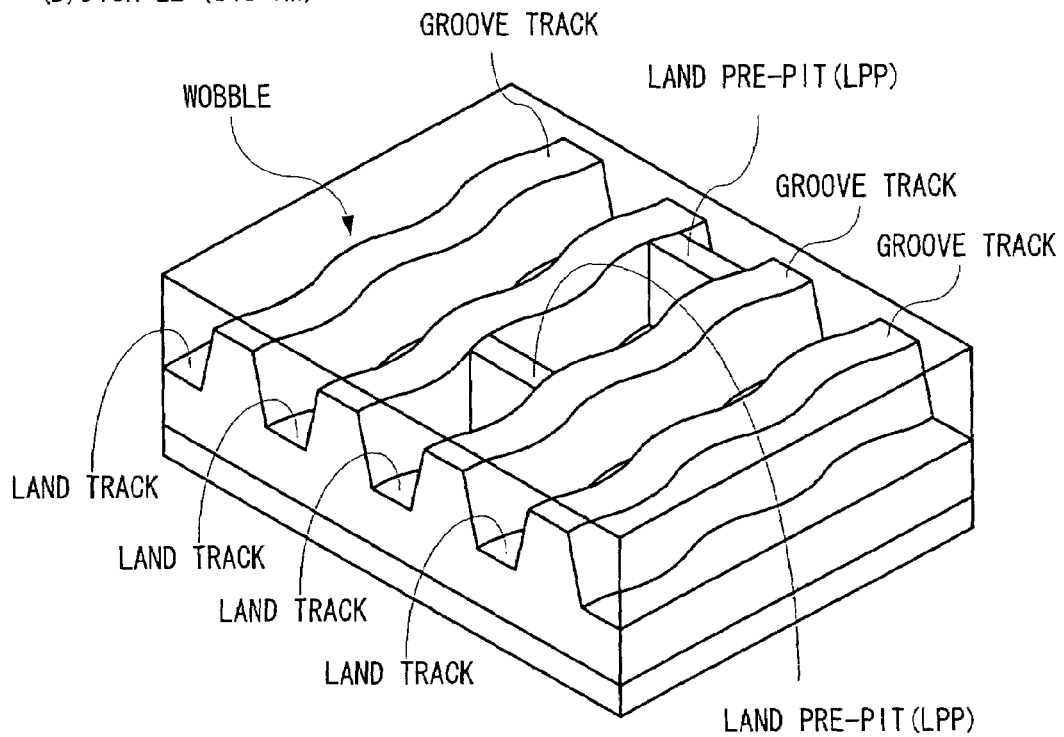
(B) DISK 22 (DVD-RW)

DISK KIND IDENTIFYING METHOD AND DISK APPARATUS

BACKGROUND OF THE INVENTION

1. Field of the invention

The present invention relates to a disk kind identifying method and a disk apparatus. More specifically, the present invention relates to a disk kind identifying method and a disk apparatus which identifies a DVD-RW or a DVD+RW and executes recording and reproducing depending upon a kind of an identified disk.

2. Description of the prior art

An example of such kind of a conventional disk apparatus is disclosed in a Japanese Patent Laying-open No. 9-198779 (G11B 19/12, G11B 7/00) laid-open on Jul. 31, 1997. The disk apparatus of the prior art detects a presence or absence of a wobble signal when a disk is rotated at a predetermined number of rotations. In a case the wobble signal is absent, the disk is determined whether the CD or the DVD in response to outputs (lock signals) from different PLL circuits each of which is locked with reproducing signals of the CD or the DVD by switching between rotation control circuits for rough servo and precise servo. On the other hand, in a case the wobble signal is present, it is determined whether the disk is the CD-R or the DVD-R on the basis of a frequency of the wobble signal. In the disk identifying apparatus, after identifying the disk, the rotation control circuit corresponding to the CD (CD-R) or the DVD (DVD-R) is selected.

In the prior art, the frequency of the wobble signal is detected, and therefore, a large-scale digital circuit for measuring the frequency is provided. However, since the CD (CD-R) and the DVD (DVD-R) are different from each other in track pitch and reflectivity, in the disk identifying apparatus of the prior art which identifies the CD (CD-R) or the DVD (DVD-R) and selects a rotation control circuit corresponding to each of them, such the digital circuit for detecting the frequency of the wobble signal is unnecessary. That is, it was possible to easily identify the CD (CD-R) or the DVD (DVD-R) on the basis of a focusing signal.

Furthermore, strictly speaking, in a case of identifying the CD or the DVD, or in a case of identifying the CD-R or the DVD-R, since they are different in track pitch and etc. described above, change of a wavelength of a laser beam is required, and therefore, in the above-described prior art, it is impossible to accurately identify the disk. In addition, the above-described prior art is for a media different in track pitch, and does not correspond to the disk such as DVD+R, DVD-R and etc. which are the same in track pitch and reflectivity.

SUMMARY OF THE INVENTION

Therefore, a primary object of the present invention is to provide a disk kind identifying method and a disk apparatus capable of accurately identifying a kind of a disk even if the disk is the same as another disk in track pitch and reflectivity.

The present invention is a disk kind identifying method that identifies a DVD-RW or a DVD+RW, comprising steps of: (a) detecting a wobble signal recorded on a recording surface of a disk; (b) determining whether a cycle of the detected wobble signal is 186 times or 32 times as long as a data cycle; and (c) identifying, when the cycle of the wobble signal is 186 times, a kind of the disk as the DVD-RW and, when the cycle of the wobble signal is 32 times, the kind of the disk as the DVD+RW.

A disk apparatus according to the present invention can be mounted with a disk of the DVD-RW or the DVD+RW. For example, the wobble signal is detected on the basis of a laser beam reflected by the recording surface of the disk, and it is determined whether the cycle of the detected wobble signal is 32 times or 186 times as long as the data cycle. Then, when the cycle of the wobble signal is 186 times, the kind of the disk is identified as the DVD-RW, and when the cycle of the wobble signal is 32 times, the kind of the disk is identified as the DVD+RW.

According to the present invention, since the kind of the disk is identified on the basis of the cycle of the wobble signal, even if one disk is the same as another disk in track pitch and reflectivity, it is possible to accurately identify the kind of the disk.

Another invention is a disk apparatus which identifies a DVD-RW or a DVD+RW and executes recording and reproducing depending upon a kind of an identified disk, comprising: a detector for detecting a wobble signal recorded on a recording surface of the disk; a determiner for determining whether a cycle of the wobble signal detected by the detector is 186 times or 32 times as long as a data cycle, and an identifier for identifying, when the cycle of the wobble signal is 186 times, the kind of the disk as the DVD-RW and, when the cycle of the wobble signal is 32 times, the kind of the disk as the DVD+RW.

In another invention, it is possible to accurately identify the kind of the disk even if one disk is the same as another disk in track pitch and reflectivity in the same manner as the above-described invention.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) is an illustrative view showing a state that a main bean and sub-beams are irradiated onto a recording surface of a disk, and FIG. 2 (B) is an illustrative view showing a configuration of a photodetector;

FIG. 3(B) is an illustrative view showing a wobble signal read from a DVD-RW, and FIG. 3(C) is an illustrative view showing a rectangular wave in a case the wobble signal read from the DVD-RW is digitally converted;

FIG. 4 (A) is an illustrative view showing a part of disk structure of the DVD+RW, and FIG. 4(B) is an illustrative view showing a part of disk structure of the DVD-RW;

DETAILED DESCRIPTION OF THE PREFERRED EMBODIMENTS

Figure 1:
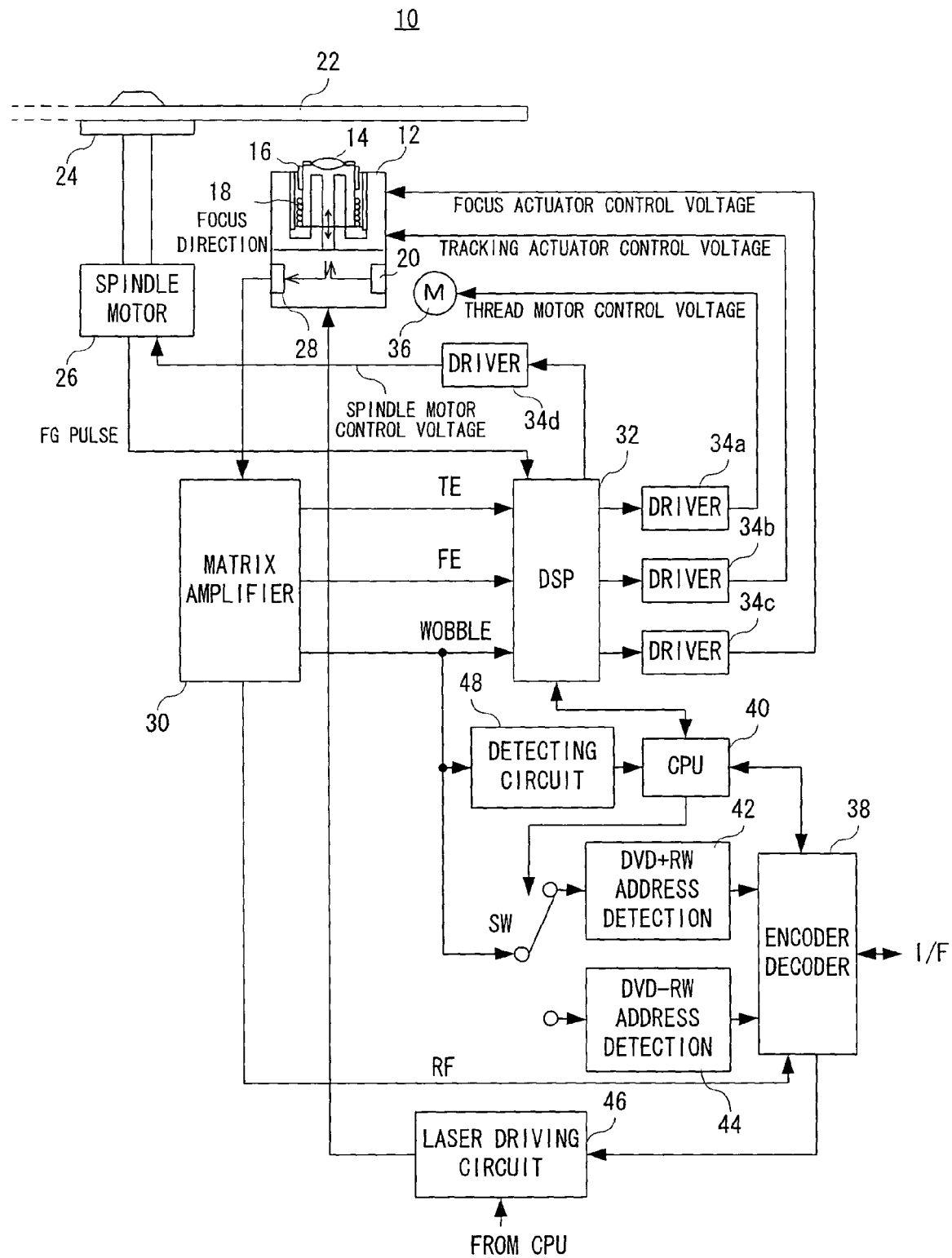
FIG. 1 is a block diagram showing one embodiment of the present invention.

Referring to FIG. 1, a disk apparatus 10 of the embodiment includes an optical pickup 12 to which an objective lens 14 is provided. The objective lens 14 is supported by a tracking actuator 16 and a focus actuator 18. A laser beam emitted from a laser diode 20 is irradiated onto a recording surface of a disk 22 such as DVD-RW and DVD+RW via an optical system (not shown) and the objective lens 14.

It is noted that the disk 22 is mounted (is subjected to chucking) on a turn table 24 and rotated by a spindle motor 26. For example, the disk 22 is rotatable by a CLV (Constant Linear Velocity) system, and the number of rotations is decreased as the optical pickup 12 moves from an inner radius to an outer radius.

The recording surface of the disk 22 is alternately formed with a convex land track and a concave groove track (see FIG. 4).

Referring to FIG. 2(A) and FIG. 2(B), the laser beam irradiated on the recording surface is specifically constructed by one main beam M and two sub-beams S1 and S2. Out of them, the main beam M is irradiated on a desired track (groove track), and the sub-beams S1 and S2 are irradiated on tracks adjacent to the desired track on both sides, land tracks.

It is noted that for brevity, FIG. 2(A) only shows the disk 22 of DVD+RW; however, in a case of the disk 22 of DVD-RW, a land pre-pit (LPP) is formed at every predetermined cycle (position) (see FIG. 4).

The laser beam reflected by the recording surface is irradiated onto a photodetector 28 via the objective lens 14 and the optical system. The main beam M is detected by photodetecting elements 28*a* to 28*d*, the sub-beam S1 is detected by photodetecting elements 28*e* and 28*f*, and the sub-beam S2 is detected by photodetecting elements 28*g* and 28*h*.

Each of the main beam M and the sub-beams S1 and S2 detected by the photodetecting elements 28*a* to 28*h* is converted into an electric current and output to a matrix amplifier 30. The matrix amplifier 30 performs well-known arithmetic manipulations as shown by equations 1 to 4 on the outputs of the photodetector 28 (photodetecting elements 28*a* to 28*h*) so as to detect a tracking error signal (TE), a focus error signal (FE), a wobble signal (serpentine) and an RF signal, respectively. It is noted that the TE signal is detected by a DPP (Differential Push-Pull) system, and the wobble signal is detected by a PP (Push-Pull) system.

$$TE=\{(A+B)-(C+D)\}-\alpha\{(E+H)-(F+G)\} \quad \text{[equation 1]}$$

$$FE=(A+C)-(B+D) \quad \text{[equation 2]}$$

$$\text{wobble}=(A+B)-(C+D) \quad \text{[equation 3]}$$

$$RF=A+B+C+D \quad \text{[equation 4]}$$

It is noted that "A" to "H" in the equations 1 to 4 correspond to the photodetecting elements 22*a* to 22*h*, respectively.

Returning to FIG. 1, each of the TE signal, the FE signal and the wobble signal detected in the matrix amplifier 30 is applied to a DSP 32 via an A/D converter (not shown). The DSP 32 performs a tracking servo and a thread servo on the basis of the digitally converted TE signal so as to generate a tracking actuator control signal and a thread motor control signal. The generated tracking actuator control signal and the thread motor control signal are converted into a tracking actuator control voltage and a thread control voltage by drivers 34*b* and 34*c*, and applied to the tracking actuator 16 and a thread motor 36. Thus, a position of the optical lens 14 in a radius direction (thread direction) and a rotational speed and rotative direction of the thread motor 36 are controlled. It is noted that the thread motor 36 is, as well-known, coupled to the optical pickup 12 by a rack and pinion method and etc., and therefore, a moving direction (moving speed) and a position (displacement) of the optical pickup 12 is controlled by the thread servo.

Furthermore, the DSP 32 executes a focus servo on the basis of the digitally converted FE signal so as to generate a focus control signal. The generated focus control signal is converted into a focus control voltage by a driver 34*a*, and applied to the focus actuator 18. Thus, a focus, i.e., a position (lens position) of the objective lens 14 on the optical axis is adjusted. That is, a position in a focus direction is adjusted.

Furthermore, the DSP 32 performs a spindle servo (hereinafter, referred to as "CLV servo") on the basis of the digitally converted wobble signal so as to generate a spindle control signal. The generated spindle control signal is converted into a spindle motor control voltage by a driver 34*d*, and applied to the spindle motor 26. Thus, a rotational speed and rotative direction of the spindle motor 26 (turn table 24), i.e., the disk 22 is adjusted.

It is noted that at the start of mounting the disk 22 on the disk apparatus 10, a signal of the disk 22, i.e., wobble signal cannot be accurately read, and therefore, the spindle servo by an FG pulse is executed. That is, the number of rotations of the spindle motor 26 is pulse-converted by an encoder (no shown), and the FG pulse thus generated is applied to the DSP 32. The DSP 32 detects the number of rotations of the spindle motor 26 on the basis of the applied FG pulse and generates a spindle control signal such that the spindle motor 26 becomes a desired number of rotations. The generated spindle control signal is converted into a spindle control voltage by a driver 34*d*, and the output is applied to the spindle motor 26.

Thus, the spindle servo (FG servo) can be executed on the basis of the FG pulse; however, the spindle servo is rougher in rotation control than the CLV servo.

Furthermore, the RF signal (reproduced signal) detected by the matrix amplifier 30 is applied to an encoder/decoder 38. It is noted that the encoder/decoder 38 is an IC and etc. integrally formed with an encoder and a decoder. The encoder/decoder 38 decodes the RF signal on the basis of address information applied from a DVD+RW address detecting circuit (decoder) 42 or a DVD-RW address detecting circuit (decoder) 44 according to an instruction from the CPU 40 so as to output the decoded RF signal to a host computer (such as) PC not shown via an interface (I/F).

Figure 3:
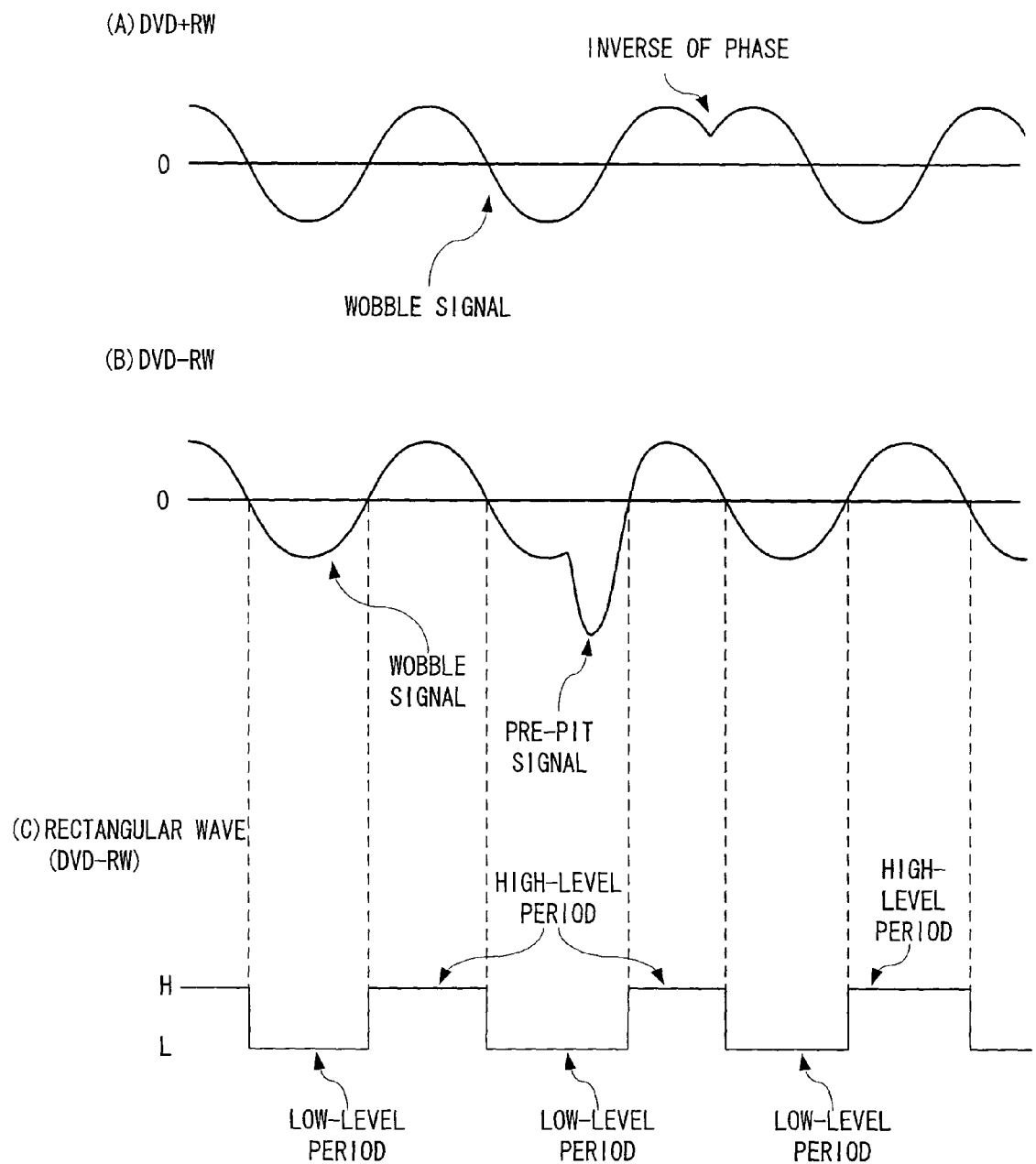
FIG. 3 (A) is an illustrative view showing a wobble signal read from a DVD+RW.

The decoder 42, as shown in FIG. 3(A), detects a position at which a phase of the wobble signal obtained in a case of reproducing the disk 22 of DVD+RW is inverted and applies to the encoder/decoder 38 address information detected on the basis of the inverted position and timing information in recording.

Furthermore, the decoder 44, as shown in FIG. 3(B), detects a pre-pit signal included in (superposed on) the wobble signal obtained in a case of reproducing the disk 22 of DVD-RW and applies to the encoder/decoder 38 address information detected on the basis of the pre-pit signal and timing information on recording.

The decoders 42 and 44 are switched by a switch SW. The switch SW is switched by the CPU 40 depending upon the kind of the disk 22 mounted on the disk apparatus 10.

In addition, the encoder/decoder 38 encodes a signal (recording signal) input from the host computer so as to generate a pit-signal and applies the pit-signal to a laser driving circuit 46 according to the address information and the timing information from the decoder 42 or 44. The laser driving circuit 46 drives the laser diode 20 according to the pit-signal applied from the encoder/decoder 38 according to an instruction of the CPU 40. Accordingly, the recording signal applied from the host computer is recorded at a desired position (address) on the recording surface of the disk 22.

As understood from FIG. 4(A) and FIG. 4(B) showing a part of the structure of the disk 22, for the disk 22 of DVD+

RW, the track (groove track and land track) is, as shown in FIG. 4(A), formed by only the wobble. On the other hand, for the disk 22 of DVD-RW, as shown in FIG. 4(B), an LPP is formed on the land track between the adjacent groove tracks at a predetermined cycle (predetermined space). Such the disk 22 is, although omitted in FIG. 4, formed by laminating a PC substrate, a reflective layer, a protective layer and a recording layer irrespective of the DVD-RW or the DVD+RW. Furthermore, both are the same in track pitch and reflectivity.

That is, the DVD-RW and the DVD+RW are the same in track pitch and reflectivity of the laser beam but different in cycle of the wobble signal (wobble) (hereinafter, referred to as "wobble cycle") recorded on the recording surface of the disk 22. More specifically, the wobble cycle of the DVD-RW is 186T while the wobble cycle of the DVD+RW is 32T. It is noted that T is a data cycle, i.e., a cycle of a reproducing signal (RF signal). Therefore, if the kind of the disk 22 is not accurately determined, it is impossible to perform recording or reproducing. For example, in spite of mounting the disk 22 of DVD-RW, in a case it is determined that the disk 22 of DVD+RW is mounted, the CLV servo cannot be accurately executed and therefore, the spindle motor 26 may be run away. In addition, it is impossible to accurately select the decoder 42 or the decoder 44. Therefore, reproducing and recording from and to the disk 22 become unstable.

Therefore, in this embodiment, in a case a main power of the disk apparatus 10 is turned on or the disk 22 is exchanged (mounted), it is determined whether the disk 22 is the DVD-RW or the DVD+RW. For example, in this embodiment, the kind of the disk 22 is determined or identified on the basis of the wobble cycle.

That is, as shown in FIG. 1, the wobble signal output from the matrix amplifier 30 is input to a detecting circuit 48 by which it is detected (determined) whether the wobble cycle is 32T or 186T. The result is applied to the CPU 40, and if the wobble cycle is 32T, the CPU 40 identifies the disk 22 as the DVD-RW. On the other hand, in a case the wobble cycle is 186T, the CPU 40 identifies the disk 22 as the DVD+RW.

Figure 5:
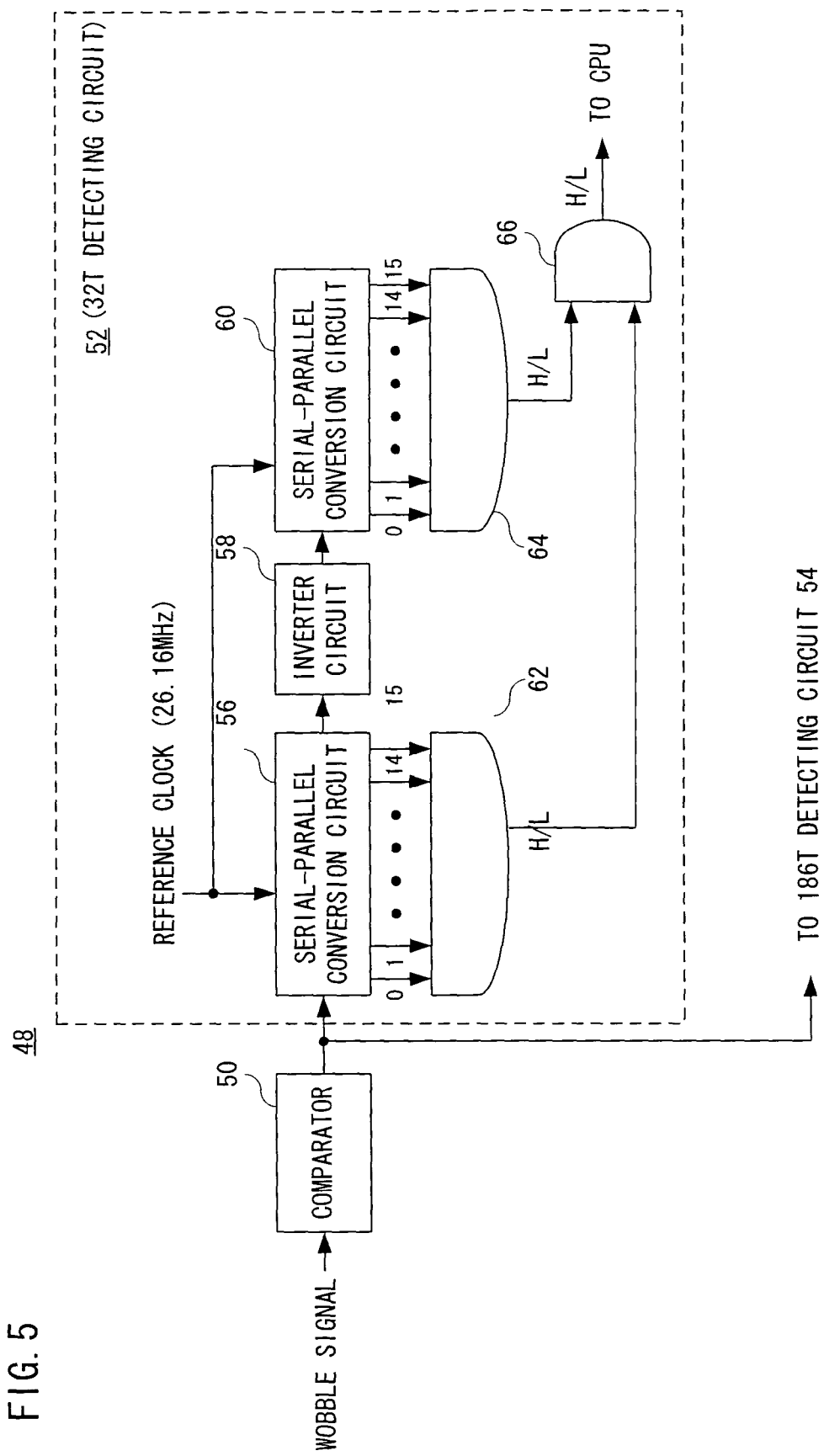
FIG. 5 is an illustrative view showing a part of a configuration of a detecting circuit shown in FIG. 1 embodiment.
Figure 6:
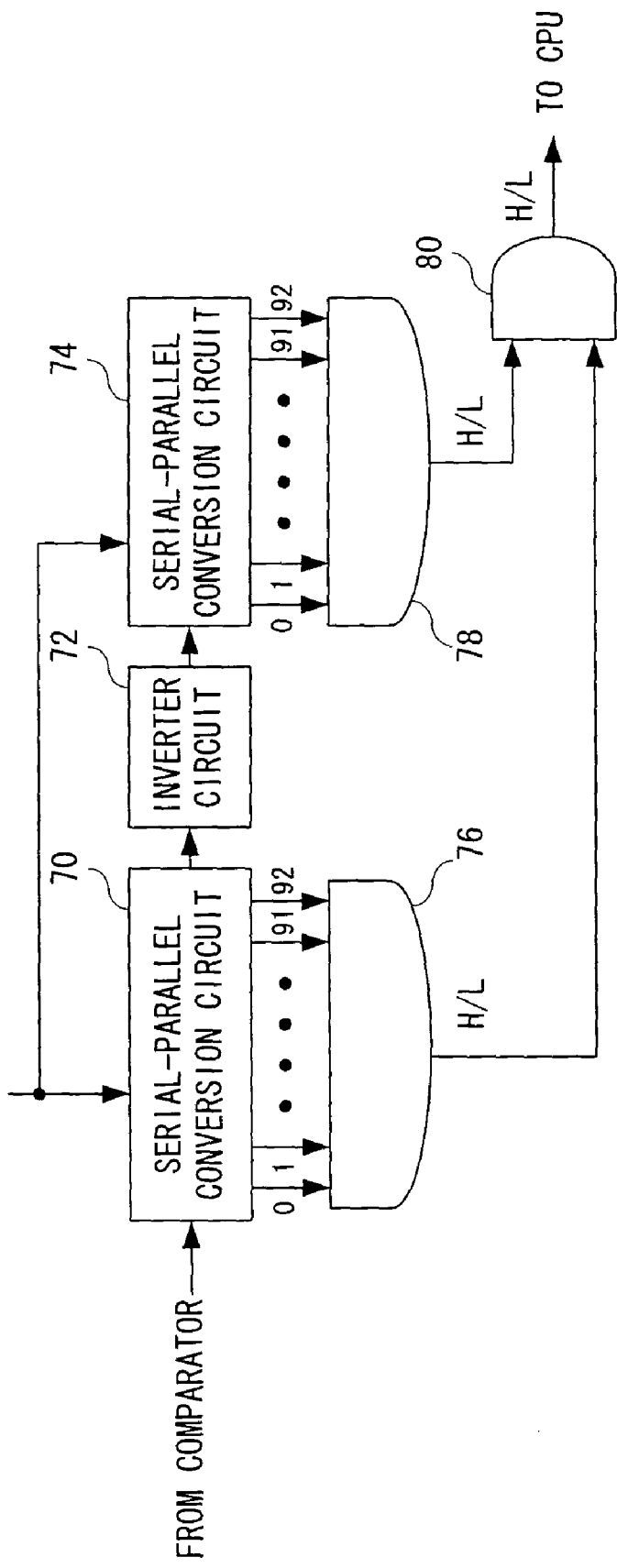
FIG. 6 is an illustrative view showing another part of the configuration of the detecting circuit shown in FIG. 1 embodiment.

A detailed configuration of the detecting circuit 48 is shown in FIG. 5 and FIG. 6. Referring to FIG. 5, the detecting circuit 48 includes a comparator 50 to which the wobble signal output from the matrix amplifier 30 is input. The comparator 50 digitally converts the wobble signal by making the 0 level as a threshold value. That is, a rectangular wave represented by a binary value of a high level and a low level shown in FIG. 3(C) is output from the comparator 50. The rectangular wave is input to a 32T detecting circuit 52 and a 186T detecting circuit 54.

It is noted that FIG. 3(C) shows the rectangular wave generated from the comparator 50 on the basis of the wobble signal obtained in a case of reproducing the disk of DVD-RW 22 shown in FIG. 3(B).

As shown in FIG. 5, the rectangular wave output from the comparator 50 is input to a serial-parallel conversion circuit 56. The serial-parallel conversion circuit 56 is a (16 bits) shift register including, although not illustrated, a flip-flop of 16 stages to each of which (bit) a reference clock (26.16 MHz) having the same cycle (frequency) as the data cycle T is input.

It is noted that an operation of such the shift register is already well-known and therefore, a detailed description of the operation is omitted in this embodiment.

The serial-parallel conversion circuit 56 detects whether or not the number of high-level periods of the rectangular wave is 16. That is, in a case signals of high level (H) are output from respective bits (bits of 0 to 15) of the shift register, the signal of high level (H) is output from an AND circuit 62. This means 16 of high-level periods of the rectangular wave exist. It is noted that when a signal of low level (L) is output from one or more bits, a signal of low level (L) is output from the AND circuit 62. This means that 16 of the high level periods of the rectangular do not exist.

Furthermore, the rectangular wave output from the serial-parallel conversion circuit 56 is inverted between the high level and the low level in an inverter circuit 58 and input to a serial-parallel conversion circuit 60. The serial-parallel conversion circuit 60 has the same structure as the serial-parallel conversion circuit 56, and determines whether or not the number of low-level periods included in the rectangular wave output from the comparator 50 is 16. That is, in a case the signals of high level (H) are output from respective bits of the shift register, the signal of high level (H) is output from an AND circuit 64. This means the number of low-level periods of the rectangular wave is 16. It is noted that when the signal of low-level (L) is output from one or more bits, the signal of low-level (L) is output from the AND circuit 64. This means the number of low-level periods of the rectangular wave is not 16.

Furthermore, outputs from the AND circuits 62 and 64 are input to an AND circuit 66, and in a case the signals of high level (H) are output from both of the AND circuits 62 and 64, the signal of high level (H) is input to the CPU 40 from the AND circuit 66. On the other hand, in a case the signal of low-level (L) is output from at least any one of the AND circuit 62 and the AND circuit 64, the signal of low-level (L) is input to the CPU 40 from the AND circuit 66.

Herein, the signal of high level (H) is input from the AND circuit 66 to the CPU 40 is when the number of the high-level periods and the low-level periods of the rectangular wave is 16, and therefore, it is possible to assume that the cycle of the rectangular wave (wobble signal) is 32 times, i.e., 32T as long as the cycle of the reference clock. Accordingly, the CPU 40, in a case the high-level signal (H) is input from the AND circuit 66, determines the wobble cycle is 32T and thereby identifies the kind of the disk 22 as DVD+RW.

On the other hand, the low level signal (L) is input from the AND circuit 66 to the CPU 40 is when the number of at least any one of the high-level periods and the low-level periods of the rectangular wave is not 16, and therefore, it is possible to say that the cycle of the wobble signal is not 32T. Accordingly, the CPU 40, in a case the low-level signal (L) is input from the AND circuit 66, determines the wobble cycle is not 32T and does not identify the kind of the disk 22.

Furthermore, as shown in FIG. 6, the rectangular wave output from the comparator 50 is input to a serial-parallel conversion circuit 70 of the 186T detecting circuit 54. The 186T detecting circuit 54 has the same configuration as the above-described 32T detecting circuit 52 except that shift registers of the serial-parallel conversion circuits 56 and 60 are constructed by 0 to 92 bits and therefore, a duplicate description is omitted.

Specifically, it is determined whether or not each of the numbers of the high-level periods and the low-level periods of the rectangular waves output from the comparator 50 is 93 in the 186T detecting circuit 54. If both the numbers of the high-level period and the low-level period of the rectangular wave are 93, the high-level signal (H) is input from an AND circuit 80 to the CPU 40. On the other hand, in a case at least any one of the numbers of the high-level periods and the low-level periods is not 93, the low-level signal (L) is input from the AND circuit 80 to the CPU 40.

Accordingly, the CPU 40, in a case the high-level signal (H) is input from the 186T detecting circuit 54, determines that the wobble cycle is 186T and identifies the kind of the disk 22 as the DVD-RW. On the other hand, the CPU 40, in a case the low-level signal (L) is input from the 186T detecting circuit 54, determines the wobble cycle is not 186T and does not identify the kind of the disk 22.

Figure 7:
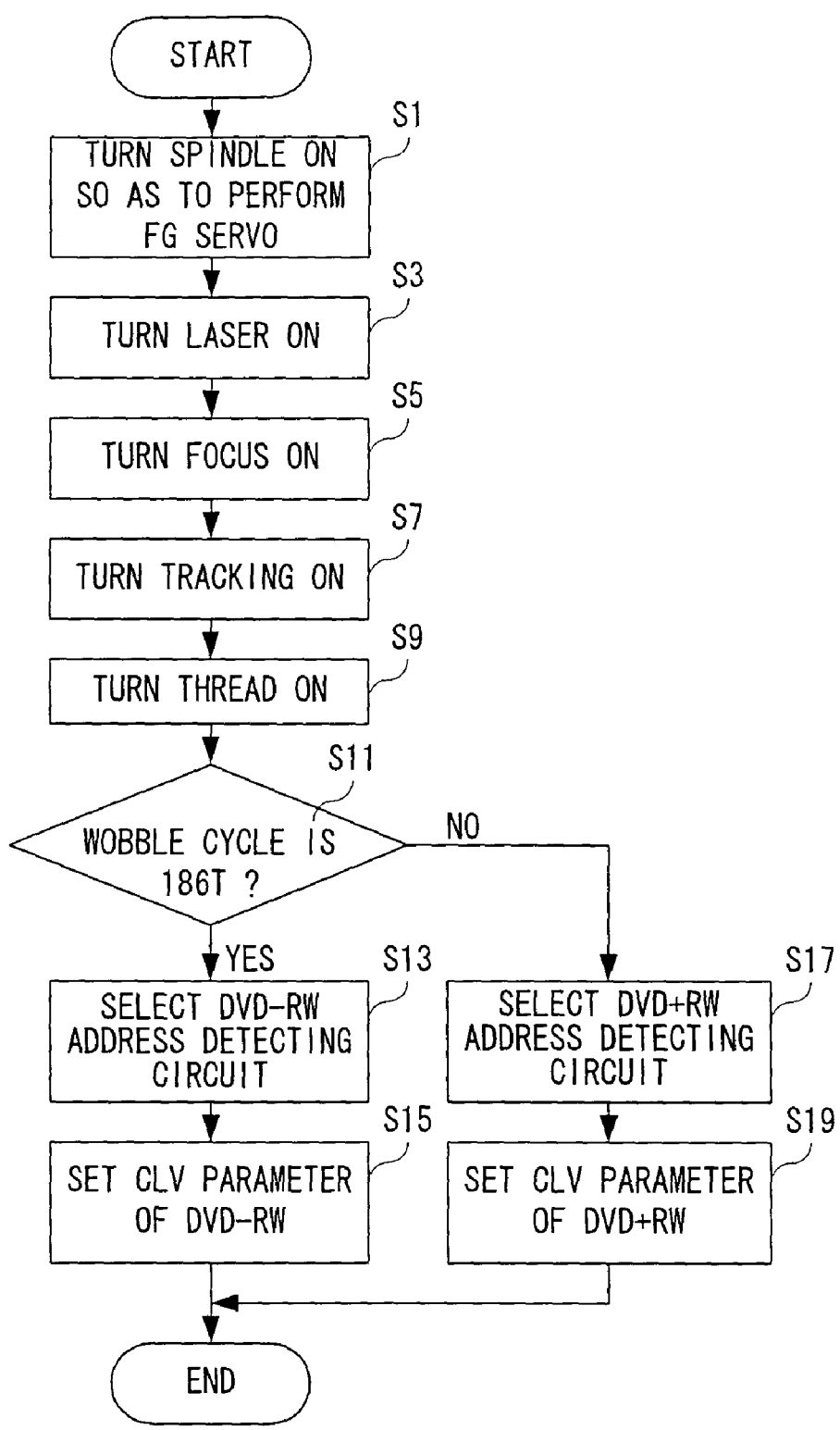
FIG. 7 is a flowchart showing an identifying process of a disk by a CPU shown in FIG. 1 embodiment.

More specifically, the CPU 40 executes a disk kind identifying process according to flowchart shown in FIG. 7. For example, when a power source of the disk apparatus 10 is turned on or the disk 22 is exchanged (mounted), the CPU 40 starts processing and turns the spindle on so as to execute the FG servo in a step S1. That is, the CPU 40 instructs the DSP 32 to drive the spindle motor 26 and execute the FG servo. In response thereto, the DSP 32 drives the driver 34d on the basis of the FG pulse. That is, the spindle motor 26 (disk 22) is controlled so as to be rotated in a desired number of rotations.

Next, a laser is turned on in a step S3, a focus is turned on in a step S5, a tracking is turned on in a step S7, and a thread is turned on in a step S9. That is, the CPU 40 instructs the laser driving circuit 46 to turn the laser diode 20 on and then instructs the DSP 32 to execute the focus servo, the tracking servo and the thread servo.

Succeedingly, it is determined whether or not the wobble cycle is 186T in a step S11. That is, it is determined whether or not the high-level signal (H) is input from the 186T detecting circuit 54. If "YES" in the step S11, that is, if the high-level signal (H) is input from the 186T detecting circuit 54, the CPU 40 determines the wobble cycle is 186T and then, selects the decoder 44 in a step S13. That is, the CPU 40 identifies the kind of the disk 22 as the DVD-RW and switches the switch SW to the decoder 44. Then, in a step S15, a parameter of the CLV servo (CLV parameter) as to the DVD-RW is set to the DSP 32, and then, the process is ended.

On the other hand, if "NO" in the step S11, that is, if the high-level signal (H) is input from the 32T detecting circuit 52, the CPU 40 determines the wobble cycle is 32T and then, selects the decoder 42 in a step S17. That is, the CPU 40 identifies the kind of the disk 22 as the DVD+RW and switches the switch SW to the decoder 42. Then, in a step S19, the CLV parameter as to the DVD+RW is set to the DSP 32 and then, the process is ended.

Thus, the kind of the disk 22 is identified and depending upon the identification result, the decoder 42 or 44 is selected. Depending upon the kind of the disk 22, the CLV parameter is set to the DSP 32, and therefore, recording and reproducing thereafter can be adequately performed.

It is noted that although omitted in the flowchart, in a case the high-level signal (H) is input from neither the 32T detecting circuit 52 nor the 186T detecting circuit, the process in the step S11 may be repeatedly executed. In a case the process in the step S11 is repeated even if a predetermined time period elapsed, incapability of identifying the kind of the disk 22 may be displayed on a display (not shown) and etc.

According to this embodiment, by determining whether or not the wobble cycle is 32T or 186T, the kind of the disk is identified, and therefore, even if one disk has the same as another disk in truck pitch and/or reflectivity, the kind of the disk can be accurately identified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk kind identifying method that identifies a DVD-RW or a DVD+RW, comprising steps of:
    (a) detecting a wobble signal recorded on a recording surface of a disk;
    (b) detecting a reproducing signal recorded on a recording surface of the disk;
    (c) determining whether a cycle of the detected wobble signal is 186 times or 32 times as long as a data cycle, by using the cycle of the detected wobble signal and a cycle of the reproducing signal; and
    (d) identifying, when the cycle of the wobble signal is 186 times, a kind of said disk as the DVD-RW and, when the cycle of the wobble signal is 32 times, the kind of said disk as the DVD+RW,
    wherein the DVD-RW and the DVD+RW have a same track pitch.

2. A disk apparatus which identifies a DVD-RW or a DVD+RW and executes recording and reproducing depending upon a kind of an identified disk, comprising:
    a detector for detecting a wobble signal and a reproducing signal recorded on a recording surface of said disk;
    a determiner for determining whether a cycle of the wobble signal detected by said detector is 186 times or 32 times as long as a data cycle, by using the cycle of the wobble signal and a cycle of the reproduced signal, and
    an identifier for identifying, when the cycle of the wobble signal is 186 times, the kind of said disk as the DVD-RW and, when the cycle of the wobble signal is 32 times, the kind of said disk as the DVD+RW,
    wherein the DVD-RW and the DVD+RW have a same track pitch.

* * * * *